United States Patent Office 3,471,540
Patented Oct. 7, 1969

3,471,540
PRODUCTION OF METAL SALTS OF DIHYDRO-
CARBYLDITHIOPHOSPHORIC ACIDS
Harold C. Walters, Bartlesville, Okla., assignor to Phillips
Petroleum Company, a corporation of Delaware
No Drawing. Filed Mar. 22, 1967, Ser. No. 624,980
Int. Cl. C07f 9/16, 9/18
U.S. Cl. 260—429.9                          6 Claims

ABSTRACT OF THE DISCLOSURE

Production of a metal dihydrocarbyldithiophosphate by contacting a dihydrocarbyldithiophosphoric acid and a metal-containing compound in the presence of heterocyclic nitrogen-containing diluents.

---

This invention relates to a method for producing metal salts of dihydrocarbyldithiophosphoric acids.

In another aspect, the invention relates to a process for forming metal salts of dihydrocarbyldithiophosphoric acid by contacting at least one dihydrocarbyldithiophosphoric acid, and at least one compound containing a Group II metal in the presence of at least one heterocyclic nitrogen-containing compound.

In another aspect, the invention relates to a method for producing zinc dihydrocarbyldithiophosphate by contacting a dihydrocarbyldithiophosphoric acid and a zinc compound such as zinc oxide in the presence of a heterocyclic nitrogen-containing compound such as pyridine.

In a specific aspect, the invention relates to a method for forming zinc dimyristyldithiophosphate by contacting dimyristyldithiophosphoric acid and zinc oxide in the presence of pyridine.

The formation of metal salts of dihydrocarbyldithiophosphoric acid by contacting the acid with a compound containing the metal is well known in the art. Prior art processes normally employ a diluent for the neutralization such as toluene, benzene, methanol, ethyl ether, ethanol, combinations thereof, and like compounds. With such compounds, attempts to obtain the desired degree of neutralization of the acid have been very erratic. That is, the amount of metal compound needed to neutralize the acid and the time required have varied widely from batch to batch. Further, dihydrocarbyldithiophosphates produced in such diluents are often unstable and tend to decompose, evolving harsh hydrogen sulfide-like odors.

It is an object of this invention to provide a process for forming metal dihydrocarbyldithiophosphates which permits good quality control from batch to batch.

Another object is to provide a process for making such compound in a stable, usable form.

Another object is to produce stable, usable metal dihydrocarbyldithiophosphates which when added to refined lubricating oils in small proportions will substantially reduce the tendency in such oils to corrode metal surfaces, particularly copper-lead and cadmium-silver bearings.

Another object is to prepare stable, usable metal dihydrocarbyldithiophosphates, particularly zinc derivatives, that are effective in dispersing sludge and maintaining a clean engine condition.

Other aspects, objects, and advantages of this invention are apparent from the disclosure and claims.

This invention provides an improved process for forming metal salts of dihydrocarbyldithiophosphoric acid comprising contacting at least one dihydrocarbyldithiophosphoric acid and at least one compound containing a Group II metal in the presence of a diluent comprising at least one heterocyclic nitrogen-containing compound.

The dihydrocarbyldithiophosphoric acids that can be used in this invention have the general formula

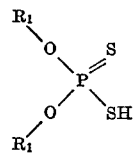

wherein $R_1$ is selected from alkyl, cycloalkyl, and aryl radicals, and combinations thereof and wherein each molecule contains about 5 to about 40 carbon atoms. Examples of these acids are: dimyristyldithiophosphoric acid, methylbutyldithiophosphoric acid, ethylpropyldithiophosphoric acid, ethylnonatriacontadithiophosphoric acid, dieicosadithiophosphoric acid, octahexadecadithiophosphoric acid, dipentadecadithiophosphoric acid, diphenyldithiophosphoric acid, dibenzyldithiophosphoric acid, dicyclododecyldithiophosphoric acid, di(p-butyl phenyl)dithiophosphoric acid, dicyclohexyldithiophosphoric acid, and the like.

As is well known in the art, the hydrocarbyl-substituted dithiophosphoric acids can be formed by reacting four moles of an alcohol with one mole of phosphorus pentasulfide in accordance with the equation

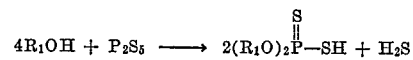

Among the alcohols which can be used to produce the acids are those alcohols that contain hydrocarbyl radicals corresponding to the $R_1$ radicals disclosed above. Of course, mixtures of such alcohols can be employed to produce mixed dihydrocarbyldithiophosphoric acids. Examples of such alcohols are methanol, ethanol, propanol, cyclododecanol, p-butylphenol, and the like, to name but a few.

The metal compounds used to neutralize the acids are those of Groups II-A and II-B of the periodic table (source of periodic table: Handbook of Chemistry and Physics, Chemical Rubber Company, 45th ed., 1964, p. B-2), especially cadmium, zinc, magnesium, calcium, and barium. Zinc compounds are preferred. The compounds have the general formula $G(Y)_m$, wherein G is a divalent metal from Groups II-A and II-B of the periodic table, Y is a monovalent or divalent radical such as O=, OH—, or CO=$_3$, and $m$ is 1 when Y is divalent, and $m$ is 2 when Y is monovalent. Examples of such compounds are zinc oxide, zinc hydroxide, zinc carbonate, magnesium hydroxide, magnesium carbonate, calcium carbonate, barium oxide, barium hydroxide, barium carbonate, cadmium oxide, cadmium carbonate, cadmium hydroxide, and the like.

The heterocyclic nitrogen-containing compounds used as the reaction medium or diluent in the process of this invention have a general formula selected from

(I)          (II)

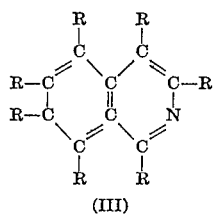

(III)

wherein each R is selected from hydrogen, alkyl, cycloalkyl, and aryl radicals, and combinations thereof, and hydrogen. Preferably, the total carbon atoms in all R groups per molecule will not exceed about 15, no one R group will contain more than about 8 carbon atoms, and at least two R groups per molecule will be hydrogen. Examples of such heterocyclic nitrogen-containing compounds include pyridine, 2,4-lutidine, 2,4,5-collidine, 4-isopropylpyridine, 3,5-diphenylpyridine, 2 - methyl-4-(n-butyl)-5-(3-ethylcyclooctyl)pyridine, 1-(2 - cyclododecylethyl)-4-methylpyridine, 4-(2-methyldodecyl)pyridine, 4-methylpyridine, quinoline, isoquinoline, 3-methyl-6-ethylquinoline, 4 - methyl-7-propylisoquinoline, 4-cyclohexylquinoline, 7-octylisoquinoline, and the like.

In general, the neutralization reaction in the presence of a heterocyclic nitrogen-containing compound can be represented as follows:

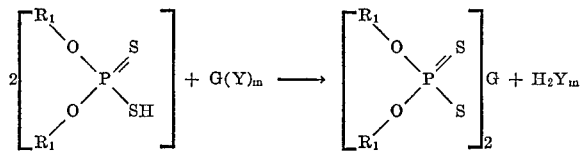

wherein $R_1$, G, Y, and $m$, have the significance described.

From the formula showing the neutralization reaction, it is evident that two mols of dihydrocarbyldithiophosphoric acid are required to neutralize each mol of the metallic compound. In practice, it is preferred to use from 0.5 to 2.5 mols of metal compound per mol of acid, although it is best to use an amount of the metal compound slightly in excess of that theoretically required to neutralize the acid to obtain optimum yields.

Generally, the process of this invention can be effected at temperatures and pressures similar to those of prior art procedures. Temperatures should be high enough to promote a reasonable rate of reaction, but not so high as to decompose the products. Sufficient pressure can be employed to maintain the reactants in the liquid state, although atmospheric pressure is often preferred because of convenience. Sufficient time should be employed to effect the degree of neutralization desired under the reaction conditions employed. Specifically, the neutralization temperature can range from about 100° F. to about 225° F. Reaction time can range from about 10 minutes to about 24 hours. Temperatures and reaction times can be used which are outside of the numerical ranges shown.

Generally, sufficient amounts of the heterocyclic nitrogen-containing compound or compounds should be employed to effect rapid, reproducible neutralization, and to make the reactor contents easy to manage. Preferably, from about 5 to about 500 percent of the heterocyclic nitrogen-containing compound or compounds based on the weight of the dihydrocarbyldithiophosphoric acid should be used, though greater or lesser amounts can be employed. Following neutralization of the acid, the heterocyclic nitrogen-containing compound or compounds employed can be separated from the other materials by such conventional techniques as steam stripping. Metal dihydrocarbyldithiophosphate can then be recovered, and utilized in a conventional manner. The use of these salts as lubricating oil additives is well known to those skilled in this art and is adequately described in the literature.

EXAMPLE I

To a stirred reactor were charged 9 g. of pyridine, 5 g. of ZnO, and 40 g. of dimyristyldithiophosphoric acid. The reactor contents were stirred and heated at 190° F. for 4 hours and then filtered through filter aid. The precipitate was washed with warm benzene. The total filtrate was then stripped of benzene and pyridine under reduced pressure at temperatures up to 270° F. The product appeared to be a good, clean preparation, and was free of any $H_2S$-like odor. The pH was determined to be 5.0. I.R. analysis indicated that the product was very high quality zinc salt of dimyristyldithiophosphate.

The run of Example I was replicated a sufficient number of times to determine that such a procedure provided a reproducible method of producing low odor, high quality zinc dimyristyldithiophosphates. Such runs also demonstrated that, in the presence of pyridine, the conversion proceeded cleanly and rapidly to stable products without employment of large excesses of ZnO.

EXAMPLE II

To a stirred reactor were charged about 625 g. of dimyristyldithiophosphoric acid, about 49 g. of ZnO, 150 g. of SAE 10 mineral oil, and sufficient benzene to form a low viscosity fluid. The reactor contents were stirred at 106° F. for 10 minutes, and then another 49 g. of ZnO was charged over a period of 3 minutes. An exothermic reaction was evident. The stirred contents were then heated at temperatures to 200° F. for 6.5 hours, more benzene was added as needed to maintain the temperature below 200° F., or at about 176° F., and it was noted that $H_2S$ was evolved. The product was then filtered through filter aid and the precipitate was washed with warm benzene. A pronounced $H_2S$-like odor was evident. This product appeared to be an emulsion, and had a pH of 3.8. Upon separation of phases by centrifuging, the product was stripped of benzene at temperatures to 220° F. The product lacked the good appearance of the products of Example I and a pronounced $H_2S$-like odor was still quite evident. The zinc content was only 4.3 percent by weight, and pH was only 3.8. Replicate runs by this same method of the prior art teaching produced similar results, but were quite erratic from run to run.

Example I demonstrates the advantages gained by the employment of heterocyclic nitrogen-containing compounds, such as pyridine, in effecting the production of zinc dihydrocarbyldithiophosphates over prior art methods of preparation as shown in Example II.

EXAMPLE III

To a SAE 20 mineral oil was admixed a zinc dihydrocarbyldithiophosphate to form a mixture containing 1.83 weight percent of the zinc salt. A Shell-4-ball wear test with such a mixture showed only 639µ wear compared to 3426µ wear for the mineral oil per se when the test was run with a 100 kg. load.

This example shows that the zinc dihydrocarbyldithiophosphate products made by the process of this invention are excellent anti-wear additives for lubricating oils.

Reasonable modification and variation are possible within the scope of the invention, the essence of which is a process for producing metal salts of dihydrocarbyldithiophosphoric acid by contacting at least one such acid and at least one metal-containing compound in the presence of a reaction diluent comprising at least one heterocyclic nitrogen-containing compound.

I claim:
1. A process of producing metal salts of dihydrocarbyldithiophosphoric acid comprising contacting at least one dihydrocarbyldithiophosphoric acid and at least one compound containing a Group II metal of the general formula $G(Y)_m$ wherein G is selected from Groups II-A and II-B, Y is selected from monovalent and divalent radicals including $O=$, $HO-$, and $CO_3=$, $m$ is 1 when Y is divalent and $m$ is 2 when Y is monovalent in the presence of at least one heterocyclic nitrogen-containing compound having the general formula

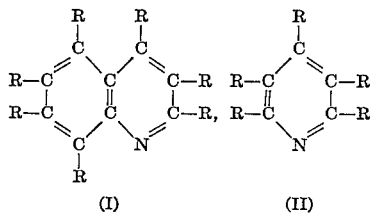

or

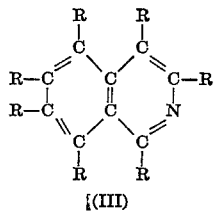

wherein each R is selected from hydrogen, alkyl, cycloalkyl, and aryl radicals, and combinations thereof.

2. The process of claim 1 wherein said acid has the general formula

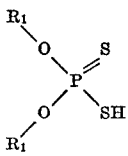

wherein $R_1$ is selected from alkyl, cycloalkyl, and aryl radicals, and combinations thereof.

3. The process of claim 1 wherein said acid is dimyristyldithiophosphoric acid, said compound containing a metal is zinc oxide, and said heterocyclic nitrogen-containing compound is pyridine.

4. The process of claim 1 wherein said Group II metal compound is a zinc compound and said heterocyclic nitrogen-containing compound is a pyridine.

5. The process of claim 1 wherein said contacting is effected at a temperature in the range 100–225° F., reaction time is in the range 10 minutes–24 hours, the amount of Group II metal to acid is from 0.5–2.5 moles of metal compound per mole of acid, and from 5 to about 500 percent of said heterocyclic nitrogen-containing compound based on the weight of dihydrocarbyldithiophosphoric acid is present.

6. The process of claim 1 wherein said heterocyclic nitrogen-containing compound is stripped from the metal salt of dihydrocarbyldithiophosphoric acid at an elevated temperature and under reduced pressure.

References Cited

UNITED STATES PATENTS

| | | | |
|---|---|---|---|
| 1,949,956 | 3/1934 | Derby et al. | 260—987 XR |
| 3,163,670 | 12/1964 | Rosenmund et al. | 260—987 XR |
| 3,168,497 | 2/1965 | Twitchett | 260—429.9 XR |
| 3,290,347 | 12/1966 | Miller | 260—429.9 |
| 3,347,790 | 10/1967 | Meinhardt | 260—429.9 XR |
| 3,351,647 | 11/1967 | Butler | 260—429.9 |
| 3,361,668 | 1/1968 | Wiese | 260—987 XR |

TOBIAS E. LEVOW, Primary Examiner

H. M. S. SNEED, Assistant Examiner

U.S. Cl. X.R.

260—429, 431, 987